Patented July 27, 1948

2,446,132

UNITED STATES PATENT OFFICE 2,446,132

SILVER CATALYSTS

Theodore W. Evans, Oakland, Calif., assignor to Shell Development Company, San Francisco, Calif., a corporation of Delaware No Drawing. Application April 2, 1946, Serial No. 659,135

1 Claim. (Cl. 252—223.3)

This invention relates to new and useful catalyst materials comprising silver and to the method of their preparation.

Catalytic materials comprising silver find application in catalytic processes of many varied types. They are used for example to catalyze many reactions encountered in the field of hydrocarbon chemistry, such as, among many others, the hydrogenation, cracking, destructive hydrogenation, dehydrogenation, polymerization, oxidation, halogenation and hydrohalogenation of hydrocarbons. Other reactions in which they are employed comprise those encountered in the production of ketones and aldehydes from primary and secondary alcohols respectively, production of nitrogen bases by the reaction of alcohols or phenols with amines or ammonia, the synthesis of hydrocarbons, as for example, by the catalytic interaction of carbon monoxide with steam or hydrogen, and many others.

The catalysts of the invention are of particular value in that they enable the more efficient direct oxidation of olefins to olefin oxides with a minimum formation of undesirable by-products, particularly carbon dioxide and water, as disclosed and claimed in copending application Serial Number 501,501 filed September 7, 1943, now U. S. Patent No. 2,404,438, issued July 23, 1946, of which the present application is a continuation-in-part.

The olefin oxides, particularly ethylene oxide, are valuable as solvents, extractants, fumigants, insecticides, and the like. In addition, they are highly valuable intermediates in the preparation of a wide variety of useful organic compounds such as alcohols, glycols, halohydrins, aldehydes, carboxylic acids, ethers, esters, alkylolamines, resins, polymers, and the like.

Processes have been disclosed in accordance with which olefins are directly catalytically oxidized to the corresponding olefin oxides. Generally speaking, the catalytic conversion of olefins, such as ethylene, to the corresponding olefin oxides is effected by subjecting the olefin and oxygen or an oxygen-containing gas, such as air, to certain elevated temperatures in the presence of a silver catalyst. Although silver catalysts have been employed in the massive form, the use of such massive catalysts requires too much silver to render the process commercially attractive. Therefore, it has been the general practice to employ the silver in an active finely divided state, in which case the active silver catalysts have been prepared, for example, by thermally decomposing suitable silver compounds such as silver oxide, and particularly a suitable organic silver compound which, on being heated, will decompose with the formation of the aforesaid active and finely divided silver catalytic material. As organic silver compounds which may thus be treated to produce the active silver catalysts, reference may be made to the silver salts of the carboxylic acids, such as formic, acetic, propionic butyric, isobutyric, valeric, oxalic, malic, malonic, maleic, lactic, and like acids. Although these compounds may be used, it is well known that the silver oxalate is particularly suitable and will readily decompose with heat to form an active silver catalytic material. Generally, such decomposition is effected by subjecting the above or other suitable inorganic or organic silver compounds, such as the silver oxide and/or silver oxalate, at substantially atmospheric pressure to an elevated temperature which is substantially at or slightly above the decomposition temperature of the organic silver compound subjected to such treatment.

The silver catalysts employed in the catalytic conversion of olefins, such as ethylene, to the corresponding olefin oxide have been promoted by small amounts of various hydroxides, oxides or peroxides of alkali and alkaline earth metals. The addition of these promoters to silver catalysts results in an increase in the olefin oxide production. However, this advantage always is offset to a great extent by a corresponding increase in the formation of undesirable by-products, particularly carbon dioxide. It is well known that two main reactions occur when an olefin such as ethylene is subjected to direct catalytic oxidation in the presence of the heretofore known promoted and/or unpromoted silver catalysts. In one of these actions the ethylene is converted to ethylene oxide, while in the other the ethylene is oxidized completely to carbon dioxide and water. Aside from the fact that the formation of carbon dioxide and water in the catalytic oxidation of ethylene adversely affects the efficiency of the process by decreasing the potential yield of the desired product, ethylene oxide, the production of carbon dioxide is also undesirable because the heat evolved during such conversion of ethylene to carbon dioxide is considerably greater than that evolved during the oxidation of ethylene to ethylene oxide, thus rendering the control of the reaction temperature increasingly difficult, if not impossible. As stated, the use of the heretofore known promoted silver catalysts, although increasing the yield of ethylene oxide (as compared to the yields obtainable when the catalytic oxidation is effected under like conditions but in the presence of an unpromoted silver catalyst), also causes a corresponding if not greater increase in the formation of undesirable by-products, e. g. the complete oxidation of the olefin to carbon dioxide.

It is an object of the present invention to provide novel, highly active catalyst materials comprising silver. Another object of the invention is the provision of highly active novel silver catalyst materials broadly applicable in the many processes wherein silver catalysts are employed. A further object of the invention is the provision of novel highly active silver catalysts which are particularly effective in selectively catalyzing the oxidation of olefins to olefin oxides. A more particular object of the invention is the provision of novel catalyst materials comprising silver particularly effective in the direct oxidation of ethylene to ethylene oxide, which catalyst materials are substantially free of any promoting effect on side reactions which convert the ethylene to undesirable by-products, particularly carbon dioxide. Other objects and advantages of the invention will become apparent from the following detailed description thereof.

It has now been discovered that the above and other objects may be attained by using certain oxygen-containing compounds of sodium and lithium, namely the sodium and lithium salts of aliphatic carboxylic acids, as promoters for silver. It has been further discovered that the sodium and lithium salts of aliphatic carboxylic acids are particularly effective in promoting the catalytic effect of silver in the oxidation of olefins to the corresponding olefin oxides without substantially increasing the production of undesirable oxidation products. With the use of these novel promoted catalysts in the process of the present invention it is possible to convert olefins, particularly ethylene, to the corresponding olefin oxide with excellent results and with the attainment of much greater ratios of olefin oxide to carbon dioxide in the reaction products than is possible with catalysts and processes of the prior art. It has also been discovered that the novel promoted catalysts possess a selectivity factor which is not possessed and cannot be attained when the heretofore known catalysts are employed for the direct catalytic oxidation of olefins to olefin oxides. The "selectivity factor" of a catalyst as this term is employed throughout this specification may be defined as the ratio of the percent of olefin converted to the corresponding olefin oxide, to the percent of olefin completely oxidized to carbon dioxide. The addition of the above-mentioned promoters, and particularly of the sodium salts of aliphatic carboxylic acids, to an active silver catalyst not only increases the conversion of ethylene to ethylene oxide as compared to the conversion attainable when using the same silver catalyst without the promotor, or with the heretofore known promoters, but also materially increases the selectivity factor of the catalyst. For instance, as shown in one of the examples presented hereinbelow, the addition of even minor amounts of sodium oxalate to an active silver catalyst more than quadrupled the conversion of ethylene to ethylene oxide over that obtained when using the same catalyst without any promoter. Also, the presence of this sodium oxalate materially increased the selectivity factor of the catalyst. The same example shows that, whereas the unpromoted silver catalysts had a selectivity factor of 0.21, the addition of the minor amounts of sodium oxalate raised the selectivity factor to 2.33, i. e. more than eleven-fold increase in the selectivity factor of the catalyst. It is readily apparent that an increase of even only a fraction of a percent in the selectivity factor denotes a substantial increase of olefin oxide in the reaction products, and therefore a substantial increase in the economic value of the catalyst and of the process employing such catalyst.

It has been found that the ability to selectively promote the oxidation of olefins to the corresponding olefin oxides in the presence of active silver is not possessed by all oxygen-containing compounds of sodium and lithium, but is shown to a marked degree by the sodium and lithium salts of aliphatic carboxylic acids. This ability is found to be present to a far lesser extent and often to a negligible degree in such oxygen-containing compounds of sodium and lithium as the oxides, peroxides and hydroxides of these two alkali metals. In this connection, reference is made to one of the examples, which includes the results of a run using a sodium hydroxide-promoted silver catalyst. It is seen therefrom that the selectivity factor of such catalyst is far below that of a silver catalyst promoted with, for example, sodium oxalate or sodium formate. It is also shown therein that the addition of sodium hydroxide, although it increased to a certain degree the conversion of ethylene to ethylene oxide over the conversion obtained by the use of an unpromoted silver catalyst, also materially increased the complete combustion of the ethylene to carbon dioxide, the production of carbon dioxide being so great as to give a selectivity factor of only 0.9, as compared to a selectivity factor of 1.2 for the unpromoted silver catalyst. In other words, the presence of the sodium hydroxide, although increasing the conversion of ethylene to ethylene oxide, increased the complete combustion of the ethylene to carbon dioxide to a greater extent, thus lowering the selectivity factor of this silver catalyst containing sodium hydroxide. The use of such a silver catalyst would therefore have but little economic advantage over the unpromoted silver catalyst.

In a preferred method of preparing the activated catalytic material for use in the execution of the process of the invention, sodium and/or lithium salts of aliphatic carboxylic acids are added in small quantities to active, finely divided silver. The following are illustrative examples of the promoters which may be used in the manufacture of the novel catalysts: sodium and lithium salts of formic, acetic, propionic, butyric, isobutyric, valeric, oxalic, malic, malonic, lactic, maleic acids, and the like. The active finely divided silver may be prepared in any suitable manner, as for example by the precipitation of the silver from solution of silver salts in the presence of a reducing agent. It may also be prepared in any of the many ways disclosed in the art, comprising thermal decomposition of an organic compound of silver, such as silver oxalate, or by the reduction at elevated temperatures of an oxygen-containing compound of silver, such as for example silver oxide or silver carbonate or any other silver compound capable of reduction to active silver.

The sodium or lithium salt of an aliphatic carboxylic acid may be added to the active, finely divided silver in quantities ranging from a fraction of a percent, e. g. 0.5%, to about 5% by weight of the active silver. This promoter is preferably added in such a quantity that the sodium or lithium in the added carboxylic acid salt will amount to, for example, from 0.25% to about 2.5% by weight of the active silver in the catalyst mass. It must be stressed, however, that the amount of the promoter material added will depend at least in part upon the method of preparing the catalyst, the specific promoter added, the activity and nature of the final catalyst desired, and the invention is not limited to any specific ratio of promoter to active silver. It is intended to use the optimum amount of promoter required for the particular oxidation operation.

If desired, more than one sodium or lithium salt of an aliphatic carboxylic acid, or both sodium and lithium salts of aliphatic carboxylic acids, may be added as activating agents to the active silver. The activating agent or agents may be added to the catalytic material during any phase of the preparation of the active silver; for example, either before or after conversion of the silver to the active state. An active silver catalyst particularly suitable for the process of selectively catalytically converting ethylene to ethylene oxide may be prepared, for example, in the following manner: A mixture is prepared containing one part by weight of silver oxalate and two parts by weight of silver oxide. To this mixture a small quantity of sodium or lithium in the form of a salt of an aliphatic carboxylic acid is added, and the mixture thus formed is then heated to a temperature at which silver oxalate decomposes to yield a finely divided silver, this temperature being in the neighborhood of about 230° C. The resulting mixture is then heated in a stream of a reducing gas, e. g. hydrogen, at a temperature of from about 200° C. to about 300° C., and preferably at a temperature of about 250° C., for a period of time sufficient to reduce any remaining silver oxide to active silver. The promoted catalyst prepared in this manner is particularly suitable for the oxidation of ethylene to ethylene oxide and possesses exceptional selective promotional characteristics.

The activated silver catalyst as prepared in accordance with the present invention may be used as such, in the form of a powder, or in the form of pellets, pastilles, pills or other shapes of desired size or form. This promoted active silver catalyst may or may not be deposited upon or mixed with any suitable carrying material such as clay, asbestos, activated carbon, charcoal, silica gel, alumina, pumice or the like. If desired, this supporting material may be incorporated into the catalytic material before or after the conversion of the silver to the active state.

Although the promoted catalysts of the present invention are particularly applicable to the catalytic selective conversion of ethylene to ethylene oxide, other olefins may be similarly treated to produce the corresponding olefin oxides. The olefins capable of being thus oxidized to the corresponding olefin oxides in accordance with the process of this invention are the normally gaseous as well as the readily volatile normally liquid olefins such as ethylene, propylene, butylenes, amylenes and their homologues and suitable substitution products. The olefins may be employed severally or in mixtures containing a plurality of different species thereof, or resort may be made to the use of mixtures thereof with relatively unreactive substances, such as mixtures of olefins and paraffins, which may be employed without resorting to the separation of the olefin or olefins therefrom prior to their being subjected to the oxidation process. Such olefins or olefin-containing mixtures may be obtained from any suitable source, for example the products resulting from any petroleum refinery operation, e. g. the products resulting from the simple distillation, thermal cracking, hydrogenation, dehydrogenation, polymerization, etc., of hydrocarbon fluids. Also, these fractions may be obtained from processes encountered in the natural gasoline industry, etc.

In carrying out the process of the present invention a stream of hydrocarbons comprising an olefin, particularly ethylene, in admixture with oxygen or an oxygen-containing gas, e. g. air, is passed in a continuous manner at elevated temperature conditions over an active silver catalyst promoted by the presence of a promoting amount of sodium or lithium introduced into the catalyst in the form of the sodium or lithium salt of an aliphatic carboxylic acid. To assure the attainment and maintenance of the desired reaction temperature, any suitable means may be resorted to in order to supply heat to the reactants or to the reaction zone, or to withdraw excess heat therefrom during the course of the reaction.

At the conditions of operation at which the olefin and oxygen are brought into contact with the catalyst, the olefin, e. g. ethylene, will react with the oxygen to form the corresponding olefin oxide, for example ethylene oxide. In accordance with the invention, the oxygen may be present as free oxygen or it may be employed in admixture with other gaseous materials such as air, steam, nitrogen, carbon dioxide, etc. The free oxygen may, if desired, be liberated or formed from oxygen-containing substances in situ at the conditions of operation.

The ratio of oxygen to olefin may vary widely within the scope of the invention, depending upon the conditions at which the operation is carried out. Although the oxidation of the olefins may be effected by employing the oxygen in amounts less than the stoichiometrical amount necessary, in the preferred embodiment of the invention the reaction is effected in the presence of an amount of oxygen at least equal to and preferably in excess of the stoichiometric amount needed to combine with the olefin available in the reaction zone.

The process of the invention may be carried out at any suitable temperature in the broad range of from about 150° C. to about 500° C. However, one of the advantages of the process is that it permits the efficient oxidation of olefins to the corresponding olefin oxides and particularly of ethylene to ethylene oxide, with substantially increased yields at temperatures not exceeding about 350° C. For example, the oxidation of ethylene to ethylene oxide may be effected at a temperature in the range of from about 200° C. to about 350° C. and preferably from about 230° C. to about 320° C., in the presence of silver activated by the presence of lithium or sodium introduced in the form of the corresponding salt of aliphatic carboxylic acid, with an excellent yield of ethylene oxide and a minimum production of carbon dioxide.

Although additional inert diluent fluids, such as nitrogen, carbon dioxide, steam, etc., may be added to the charge subjected to the catalytic oxidation in accordance with the process of the present invention, the efficient operation of the process in the relatively low temperature range greatly facilitates the problem of heat control. It has been found that as a result of the selective promotional effect of the novel catalyst in the process, the material decrease in the tendency toward destructive exothermic oxidation reactions leading to the formation of considerable proportions of carbon dioxide in the reaction products substantially suppresses the need for these additional diluent fluids.

Although it is preferable to effect the process of the present invention at pressures slightly in excess of atmospheric, the process may if desired be carried out at subatmospheric or superatmospheric pressures. The optimum pressure to be employed will be governed by the conditions of operation and the nature of the materials treated.

Reaction products resulting from the process may be subjected to any subsequent treatment to separate the desired constituent or constituents from the remaining reaction products. For example, the olefin oxide, e. g. ethylene oxide, may be separated from the remaining reaction products by any suitable method of separation, comprising fractionation, absorption, adsorption, and/or extraction.

For illustrative purposes only, reference is made to the several examples which describe certain methods of preparing the novel promoted silver catalyst and the preferred modes, conditions and advantages of effecting the catalytic oxidation reaction in accordance with the process of the present invention.

*Example I*

Two silver metal-containing catalysts were prepared in the following manner:

1. About one part by weight of silver oxalate was mixed with about two parts by weight of silver oxide, and the mixture was then heated until the silver compounds were substantially completely converted to finely divided silver metal.

2. About one part by weight of silver oxalate was mixed with about two parts by weight of silver oxide. Sodium oxalate was then added in an amount equal to about 3% by weight of the mixture, which latter was then heated until the silver compounds were substantially completely converted to finely divided silver.

Over each of the above catalyst there was passed about the same volume of an ethylene-air mixture consisting of 28% by volume of ethylene and 72% by volume of air. This mixture was passed over the catalyst at a rate of about one liter of the gas mixture per 2 grams of catalyst per hour. In each case the catalyst was maintained at a temperature of about 240° C.

In the following table, column A shows the conversion (in percent by weight) of ethylene to ethylene oxide, while column B shows the weight percent of carbon dioxide produced. The selectivity factor is shown in the third column under "S."

| Catalyst | A | B | S |
|---|---|---|---|
| 1. (No promoter) | 3.0 | 12.9 | 0.21 |
| 2. ($Na_2C_2O_4$ promoted) | 12.2 | 5.2 | 2.33 |

A comparison of the results presented in this example shows that the addition of about 3% of sodium oxalate to a silver catalyst produced by the decomposition of the above mixture of silver oxalate and silver oxide more than quadrupled the conversion of ethylene to ethylene oxide, as compared to the conversion obtained when using the same silver catalyst without the promoter. Also, this material increase in the ethylene oxide was obtained with a carbon dioxide production which amounted to only about one-third of that obtained when using the unpromoted silver catalyst.

*Example II*

One unpromoted and three promoted silver metal-containing catalysts were prepared as follows:

1. Silver oxide was heated for one hour at 220° C. to obtain a finely divided unpromoted silver.

Three promoted silver metal-containing catalysts were prepared by mixing the promoter with silver oxide and heating the resulting mixture of silver oxide and added promoter for one hour at 200° C. to obtain the promoted silver metal-containing catalyst. The promoter and quantity thereof added to the silver oxide prior to heating, in percent by weight of silver oxide used, are indicated in the following table opposite the respective catalyst number:

No. 2—1% sodium hydroxide
No. 3—3% sodium oxalate
No. 4—3% sodium formate

An ethylene-air mixture consisting of 28% by volume of ethylene and 72% by volume of air was passed over the catalysts at a rate of about one liter of the gas mixture per 2 grams of catalyst per hour at the temperature indicated in the table presented below. In this table, the conversion of ethylene to ethylene oxide, in percent by weight, is given in column A. The figures in column C indicate the ratio of the percent by weight of ethylene converted to ethylene oxide to the percent by weight of ethylene converted to ethylene oxide and carbon dioxide. The selectivity factor of each catalyst based upon the indicated results is shown in column S.

| Catalyst | 240° C. | | | 260° C. | | |
|---|---|---|---|---|---|---|
| | A | C | S | A | C | S |
| 1. (No promoter) | 5.1 | .55 | 1.2 | 7.2 | .45 | 0.8 |
| 2. (NaOH promoted) | 9.7 | .47 | 0.9 | 6.3 | .38 | 0.6 |
| 3. ($Na_2C_2O_4$ promoted) | 8.0 | .67 | 2.0 | 12.4 | .67 | 2.0 |
| 4. ($NaCHO_2$ promoted) | 9.2 | .74 | 2.8 | 13.3 | .68 | 2.2 |

A comparison of the results presented in the above table shows the advantages of effecting the oxidation of ethylene to ethylene oxide in the presence of a silver catalyst containing minor amounts of sodium oxalate or sodium formate over the unpromoted catalyst or even one containing sodium hydroxide. The addition of the minor amounts of either sodium oxalate or sodium formate not only increased the conversion of ethylene to ethylene oxide to a very great extent, but also decreased the total combustion of the ethylene to carbon dioxide, thus materially increasing the selectivity factor of the catalysts promoted with the sodium salts of the aliphatic carboxylic acids. On the other hand, the addition of sodium hydroxide, although it caused an increase in the conversion of ethylene to ethylene oxide when the oxidation reaction was effected at 240° C., also caused a material increase in the total combustion of ethylene, so that the selectivity factor of the silver catalyst containing sodium hydroxide was even lower than that of the unpromoted catalyst. A comparison of the results obtained at an operating temperature of 260° C. with the unpromoted catalyst and the catalyst containing sodium hydroxide clearly shows the negative effects of the addition or incorporation of sodium hydroxide.

I claim as my invention:

A promoted silver metal-containing catalyst consisting essentially of silver metal and from about 0.5% to about 5% by weight of sodium oxalate.

THEODORE W. EVANS.

REFERENCES CITED

The following references are of record in the file of this patent:

UNITED STATES PATENTS

| Number | Name | Date |
|---|---|---|
| 2,307,421 | Overhoff | Jan. 5, 1943 |